United States Patent
Jang et al.

(10) Patent No.: US 7,971,920 B2
(45) Date of Patent: Jul. 5, 2011

(54) WALK-IN MEMORY APPARATUS FOR AUTOMOBILE SEAT

(75) Inventors: Jae Yong Jang, Ansan-si (KR); Jong Moon Yoo, Gunpo-si (KR); Byung Jae Lee, Gunpo-si (KR); Sang Man Seo, Ansan-si (KR); Eun Sue Kim, Hwaseong-si (KR)

(73) Assignees: Hyundai Motor Company, Seoul (KR); Kia Motors Corporation, Seoul (KR); Daewon Precision Industrial Co., Ltd., Ansan-Si (KR)

( * ) Notice: Subject to any disclaimer, the term of this patent is extended or adjusted under 35 U.S.C. 154(b) by 214 days.

(21) Appl. No.: 12/345,495

(22) Filed: Dec. 29, 2008

(65) Prior Publication Data
US 2010/0019525 A1    Jan. 28, 2010

(30) Foreign Application Priority Data
Jul. 23, 2008 (KR) .......... 10-2008-0071700

(51) Int. Cl.
*B60N 2/07* (2006.01)
*B60N 2/12* (2006.01)

(52) U.S. Cl. .......... 296/65.13; 296/65.16; 296/65.01; 297/341

(58) Field of Classification Search .......... 296/65.16, 296/65.13, 65.01; 297/341; 248/429
See application file for complete search history.

(56) References Cited

U.S. PATENT DOCUMENTS

| | | | | |
|---|---|---|---|---|
| 5,820,216 A * | 10/1998 | Feuillet | .......... | 297/341 |
| 7,059,679 B2 * | 6/2006 | Yamada | .......... | 297/341 |
| 7,628,441 B2 * | 12/2009 | Quast | .......... | 296/65.13 |
| 2009/0200849 A1 * | 8/2009 | Schmale | .......... | 297/341 |
| 2010/0176265 A1 * | 7/2010 | Kojima et al. | .......... | 248/429 |

FOREIGN PATENT DOCUMENTS

| | | |
|---|---|---|
| JP | 09-267669 A | 10/1997 |
| JP | 2004-114853 A | 4/2004 |
| JP | 2004-249862 A | 9/2004 |
| KR | 100759180 B1 | 9/2007 |

* cited by examiner

*Primary Examiner* — Jason S Morrow
(74) *Attorney, Agent, or Firm* — Morgan, Lewis & Bockius LLP

(57) ABSTRACT

A walk-in memory apparatus for an automobile seat locks the seat on a body only after the seat moves past a preset reference point when the seat, moved forwards with a seat back folded up by a seat walk-in apparatus, moves backwards with the seat back unfolded. The walk-in memory apparatus causes the entire seat to move forwards along tracks in an unlocked state when the seat back is folded up. The seat includes a track memory unit which, when the seat moves backwards with the seat back unfolded, causes the seat to be unlocked from the track when the stopper bracket is located ahead of a reference stopper and to be locked on the track when the stopper bracket is located behind the reference stopper.

12 Claims, 11 Drawing Sheets

WALK-IN MEMORY APPARATUS FOR AUTOMOBILE SEAT

CROSS-REFERENCE TO RELATED APPLICATION

The present application claims the priority to Korean Patent Application No. 10-2008-0071700 filed Jul. 23, 2008, the entire contents of which applications is incorporated herein for all purposes by this reference.

BACKGROUND OF THE INVENTION

1. Field of the Invention

The present invention relates to a walk-in memory apparatus for an automobile seat, and more particularly, to a walk-in memory apparatus for an automobile seat, which causes the seat to be locked on a vehicle body only after the seat has moved past a preset reference point when the seat, moved forwards with a seat back folded up by a seat walk-in apparatus, moves backwards with the seat back unfolded.

2. Description of Related Art

In general, a seat for an automobile is equipped with a reclining apparatus that can adjust the angle of a seat back for convenience of an occupant.

In addition to the reclining apparatus, the automobile seat is also equipped with a folding apparatus that can fold up the seat back in a forward direction as well as a walk-in apparatus that can shift the entire seat in forward or backward directions.

FIGS. 1 and 2 are views explaining the operation of a conventional walk-in apparatus for an automobile seat As illustrated in FIGS. 1 and 2, an automobile having only front doors without rear doors is equipped with a walk-in apparatus, which allows an entire seat to move forwards with a front seat folded up in a forward direction such that the occupant for the rear seats can get in or out of the rear seat.

A walk-in lever 1 is installed on one side of the seat such that the seat can carry out a walk-in function. When the walk-in lever 1 is raised, a cable cooperates with the walk-in lever 1 through a link, and thus operates the reclining apparatus of the seat back. Thereby, the seat back 10 is folded up in a forward direction.

In this manner, when the walk-in cable is pulled while the seat back 10 is folded up in a forward direction, the seat is unlocked from a track, and thus slides forwards by means of a spring installed on the track.

Meanwhile, when intended to be returned to its original position, the seat is pushed backwards. When the seat arrives to an appropriate position, the folded seat back 10 is unfolded backwards. Thereby, the seat is locked on the track at that position.

As described above, the conventional walk-in apparatus for an automobile seat is configured so that, when the folded seat back is unfolded, the seat is locked on the track at that position. However, the occupant typically folds up the seat back first, and then pushes the seat in a backward direction. For this, the occupant has to pull a slide lever below the seat again to displace the seat such that the seat locked on the track can slide.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

An aspect of the present invention provide a walk-in memory apparatus for an automobile seat, in which the seat, after set to a walk-in state, is not locked on a track when located ahead of a preset position although a seat back is unfolded in order to return the seat to its original position and is locked on the track when located behind the preset position, thereby eliminating inconvenience of a occupant who must fix a position of the seat twice after unfolding the seat back.

An aspect of the present invention is directed to a walk-in memory apparatus for an automobile seat of a vehicle. The apparatus may include a track formed on a bottom portion of the vehicle, a track memory member connected to the seat, the track memory member including a stopper bracket, wherein the track memory member may be slidably mounted to the track, and/or a reference stopper displaced on a portion of the track. The reference stopper activates the stopper bracket of the track memory member such that the track memory member may be unlocked from the track when the stopper bracket is located ahead of the reference stopper and but locked with the track when the stopper bracket is located behind the reference stopper and moves backwards.

The track memory member includes an external force-providing member providing external force in cooperation with folding operation of the seat back, an unlocking member pivotally coupled to a base, the unlocking member selectively activated by the external force-providing member, wherein the unlocking member has a restoring force, a locking member pivotally coupled to the base, the locking member selectively pivoted by the unlocking member, a track lock plate hingedly coupled to the seat, the track lock plate selectively disengaged from the track, by the locking member such that the seat slides, and/or a latch plate pivotally coupled to the base, the latch plate selectively being engaged with the locking member such that the locking member continues to unlock the track lock plate to the track while the unlocking member does not apply the external force to the locking member, wherein the stopper bracket activated by the reference stopper, releases the latch plate from the locking member to lock the track lock plate to the track when the seat moves backwards.

The restoring force of the unlocking member may be enforced by an elastic member. The track lock plate may be biased toward the track memory plate by an elastic member. The unlocking member may include at least two sections pivotally coupled each other. A lock guide may be formed on the track in a longitudinal direction thereof.

The external force-providing member may include a pressing member offset from a rotation center of the seatback and attached to the seat back, a rotating member co-axially coupled to the rotation center of the seat back, one end of which may be restoreably rotated by operation of the pressing member, and/or a cable connecting the other end of the rotating member with the unlocking member. The rotating member may be restored by a coil spring.

The locking member includes a guide recess to selectively receive a first end of the unlocking member, the guide recess activated by the unlocking member, and/or a catch step to selectively catch a second end of the unlocking member even when the unlocking member may be disengaged from the locking member. The stopper bracket may be pivotally connected with the latch plate, and causes the locking member to be released from the latch plate by the reference stopper when the seat moves backwards. The stopper bracket may be connected with the latch plate via a latch pin and a contact part of the stopper bracket may be offset from the latch pin. The contact part has a slope at one end thereof such that the stopper bracket freely rotates the latch plate with respect to the latch pin when the seat moves forwards after contact with the reference stopper but may be raised when the seat moves backwards after contact with the reference stopper.

Another aspect of the present invention is directed to a walk-in memory system for an automobile seat of a vehicle. The system may include a track formed on a bottom portion of the vehicle, a track memory member connected to the seat, the track memory member including a stopper bracket, wherein the track memory member may be slidably mounted to the track, and/or a reference stopper formed on a portion of the track. The reference stopper may activate the stopper bracket of the track memory member such that the track memory member may be unlocked from the track when the stopper bracket may be located ahead of the reference stopper and but locked with the track when the stopper bracket may be located behind the reference stopper and moves backwards.

The walk-in memory apparatus may further include a track formed on a bottom portion of the vehicle, a track memory member connected to the seat, the track memory member including a stopper bracket, wherein the track memory member may be slidably mounted to the track, and/or a reference stopper displaced on a portion of the track, wherein, the reference stopper activates the stopper bracket of the track memory member such that the track memory member may be unlocked from the track when the stopper bracket may be located ahead of the reference stopper and but locked with the track when the stopper bracket may be located behind the reference stopper and moves backwards.

A passenger vehicle may include any of the walk-in memory apparatus described above. Similarly, a passenger vehicle may include any of the walk-in memory systems described above.

In accordance with various embodiments of the present invention, when the seat back of a front seat is unfolded after an occupant gets in a rear seat in a walk-in state of the front seat, the seat is not locked on a track at a position where the seat back is unfolded, and is locked on the track a position where the seat moves past a preset reference point (herein, the reference stopper). Accordingly, the walk-in memory apparatus eliminates inconvenience of the occupant who must unfold the seat back to unlock the seat and then lock the seat at a desired position as in the conventional walk-in memory apparatus.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 1:
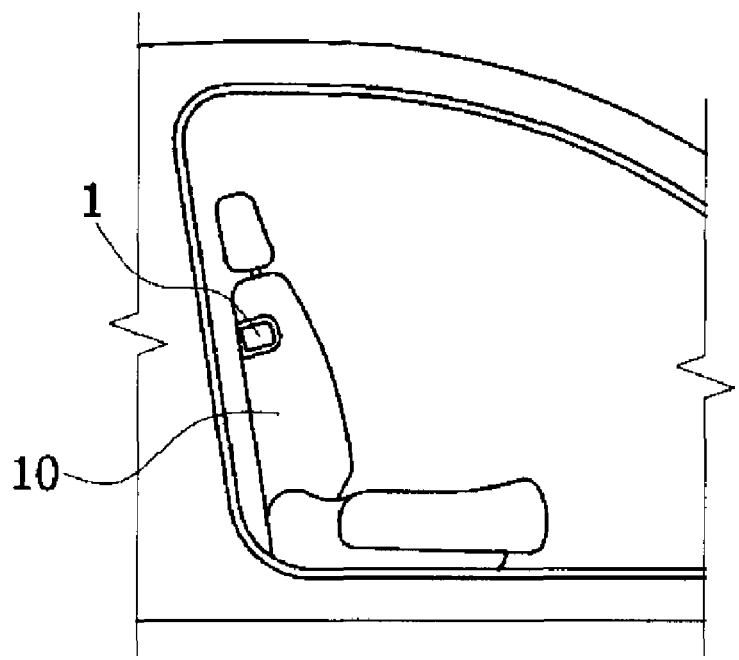
FIGS. 1 and 2 are views explaining the operation of a walk-in apparatus for an automobile seat.
Figure 2:
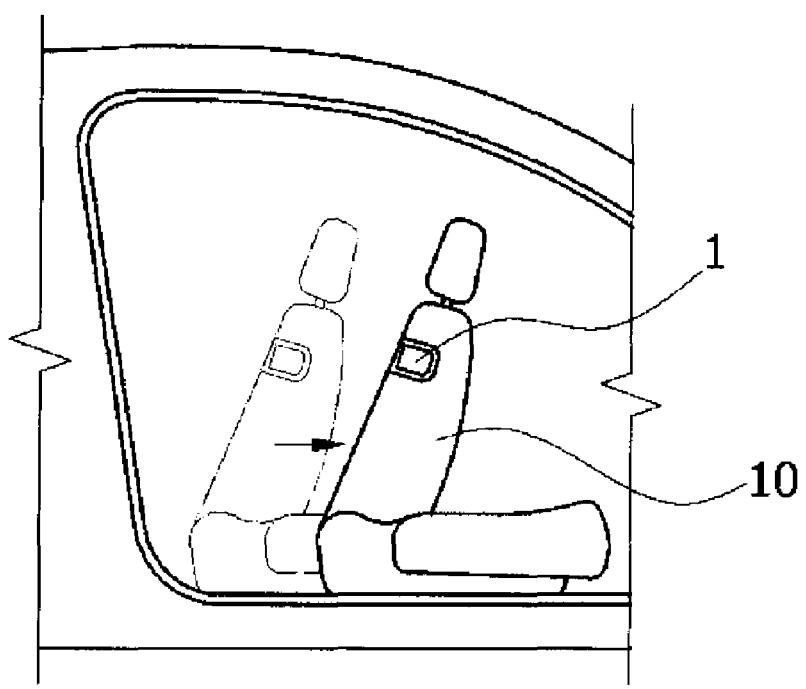
Figure 3:
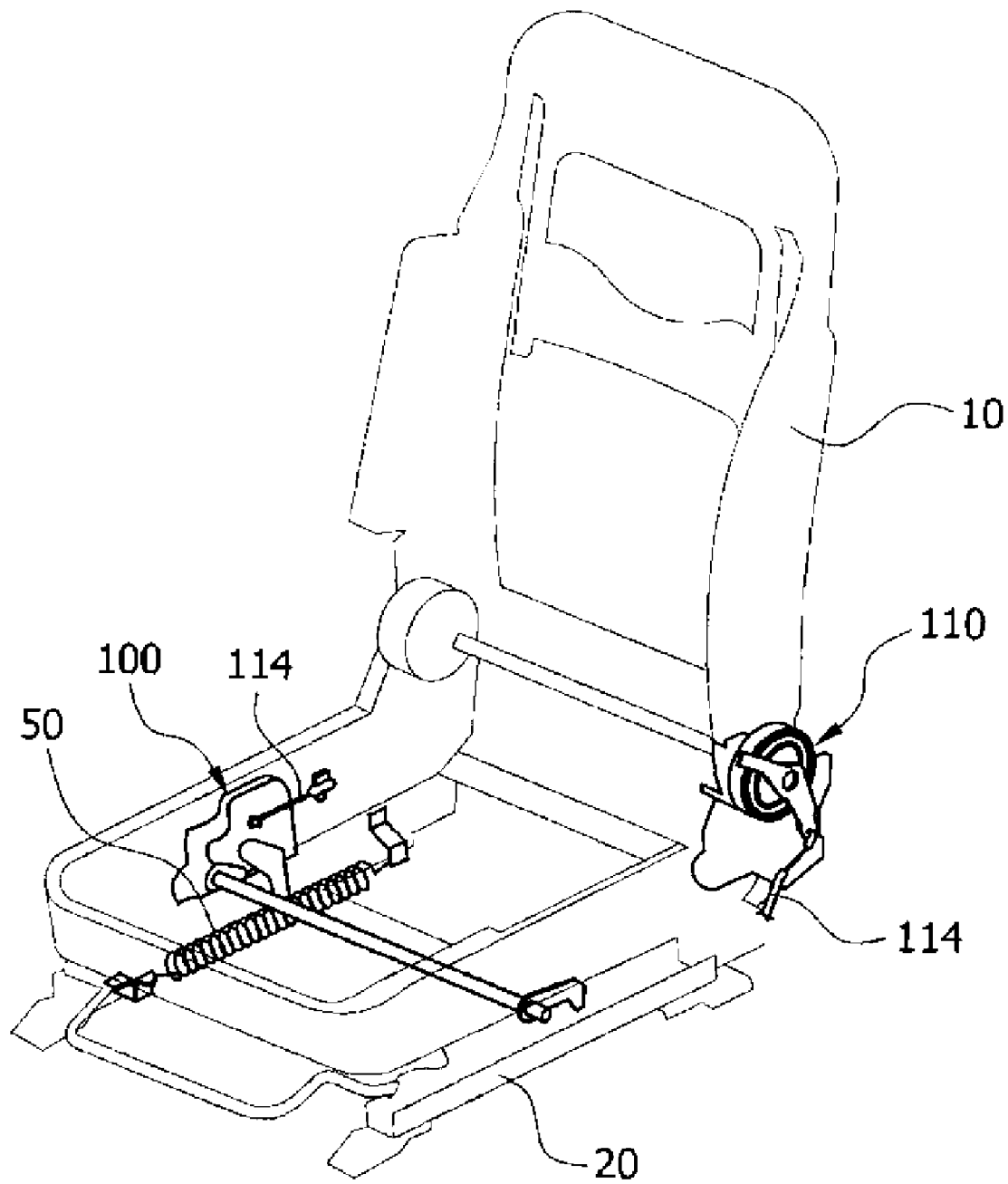
FIG. 3 is a perspective view illustrating a seat on which an exemplary walk-in memory apparatus for an automobile seat is installed in accordance with the present invention.
Figure 4:
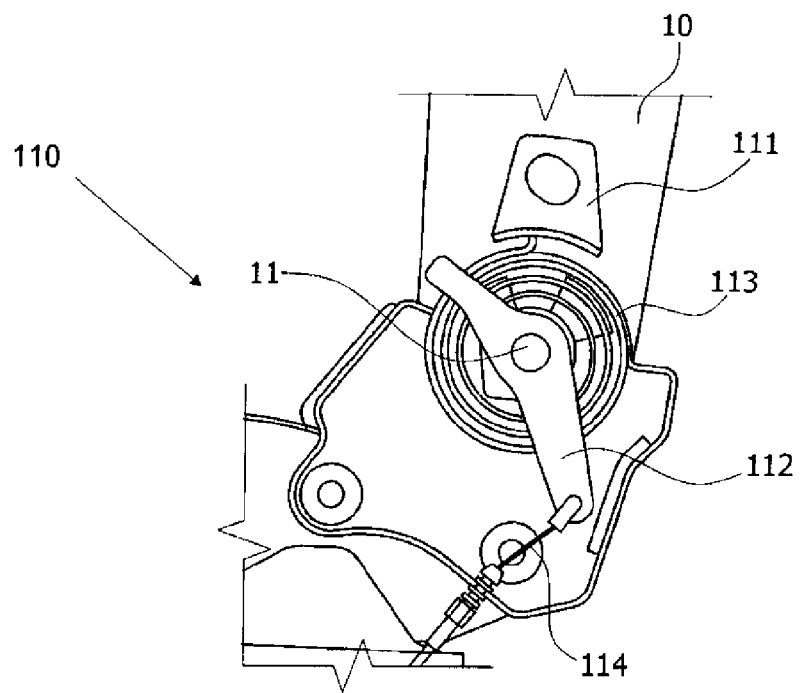
FIG. 4 is a front view illustrating an exemplary external force-providing member in accordance with the present invention is installed.
Figure 5:
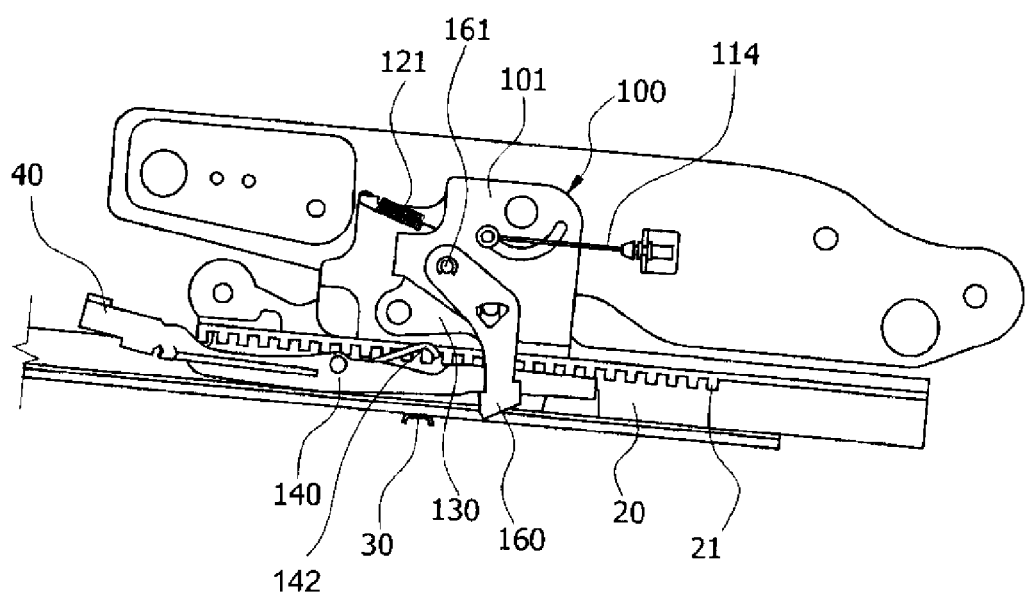
FIG. 5 is a side view illustrating a seat on which an exemplary track memory member is installed in accordance with the present invention.
Figure 10:
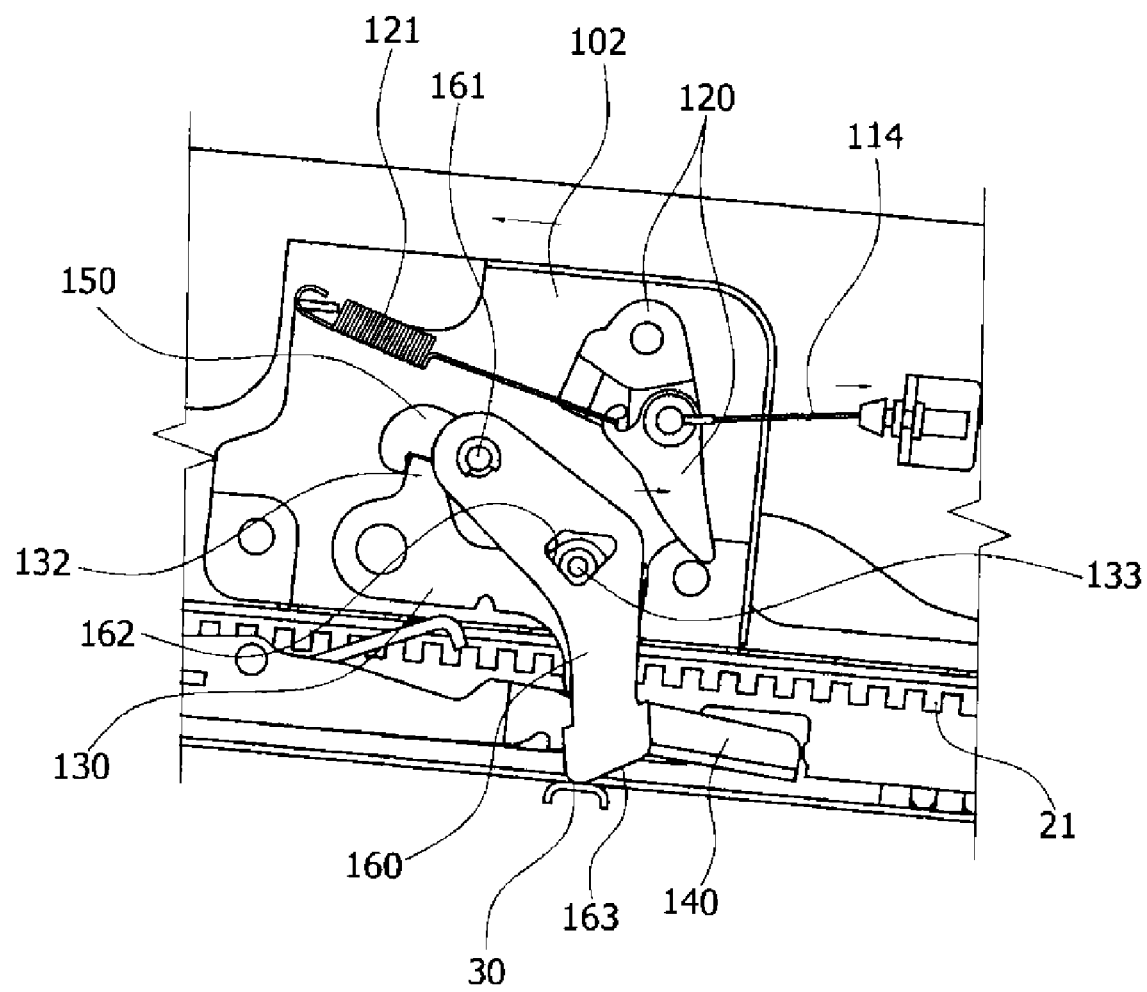
Figure 11:
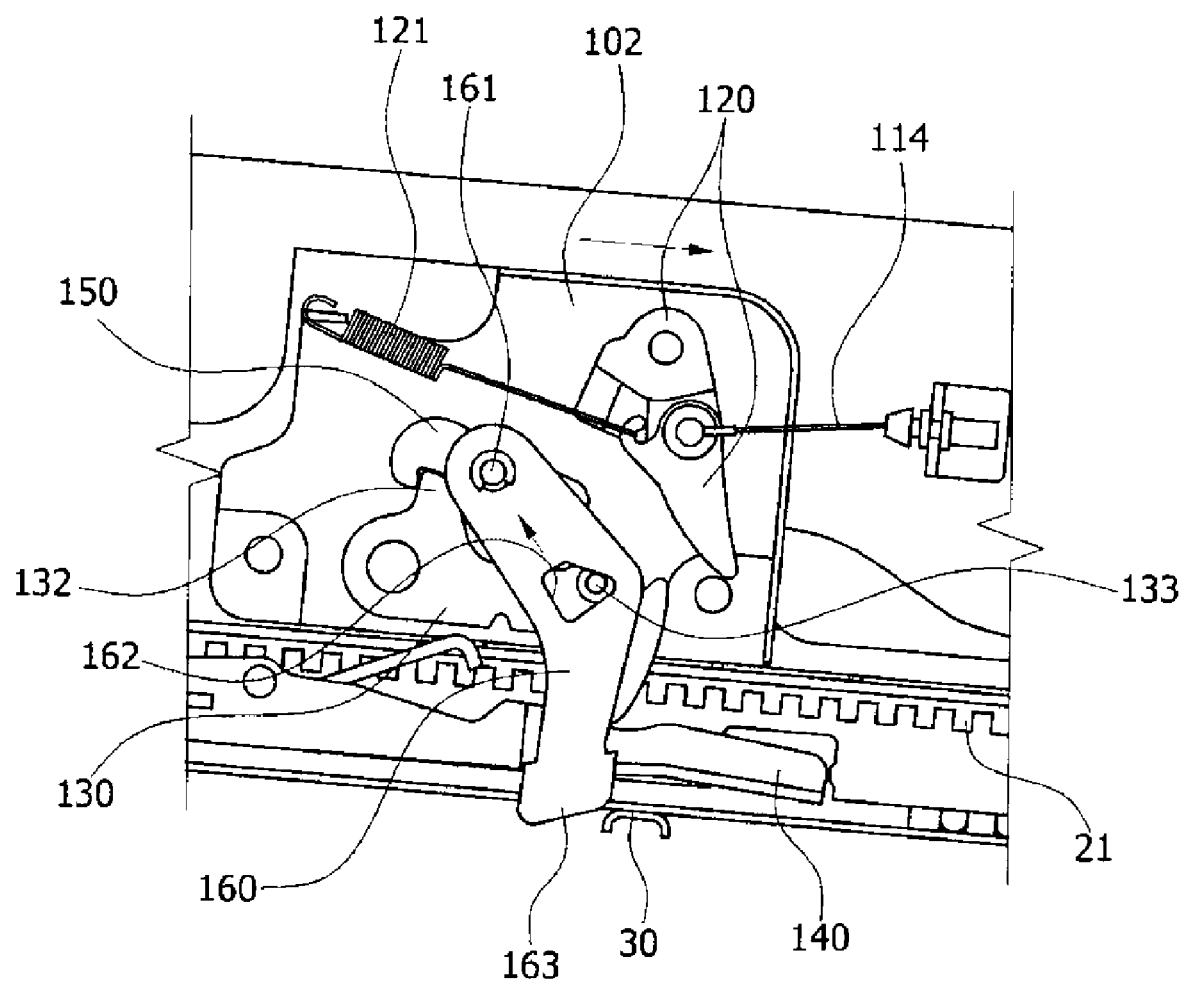
FIGS. 11 through 13 are operational views illustrating how a seat is locked on a track when moving backwards in accordance with the present invention.
Figure 12:
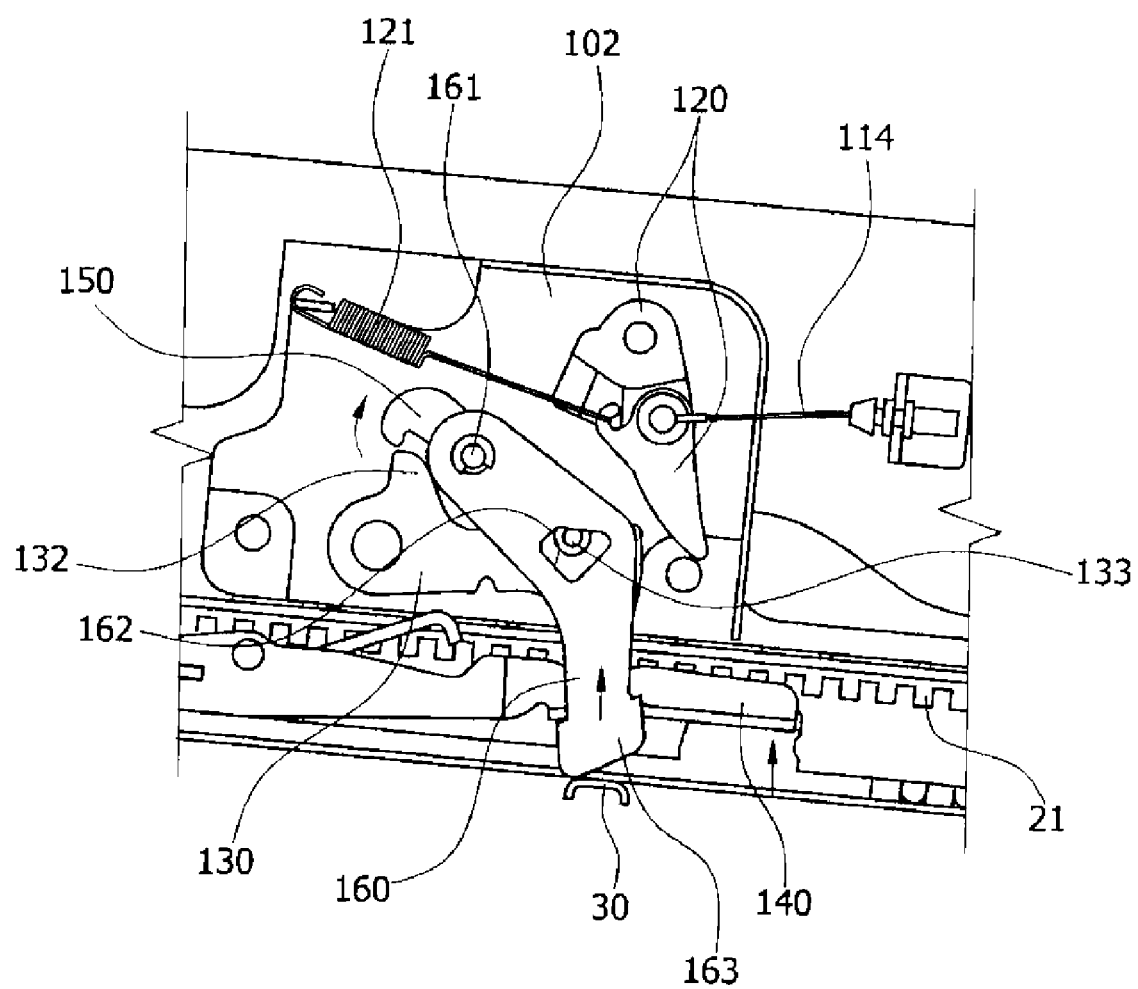
Figure 13:
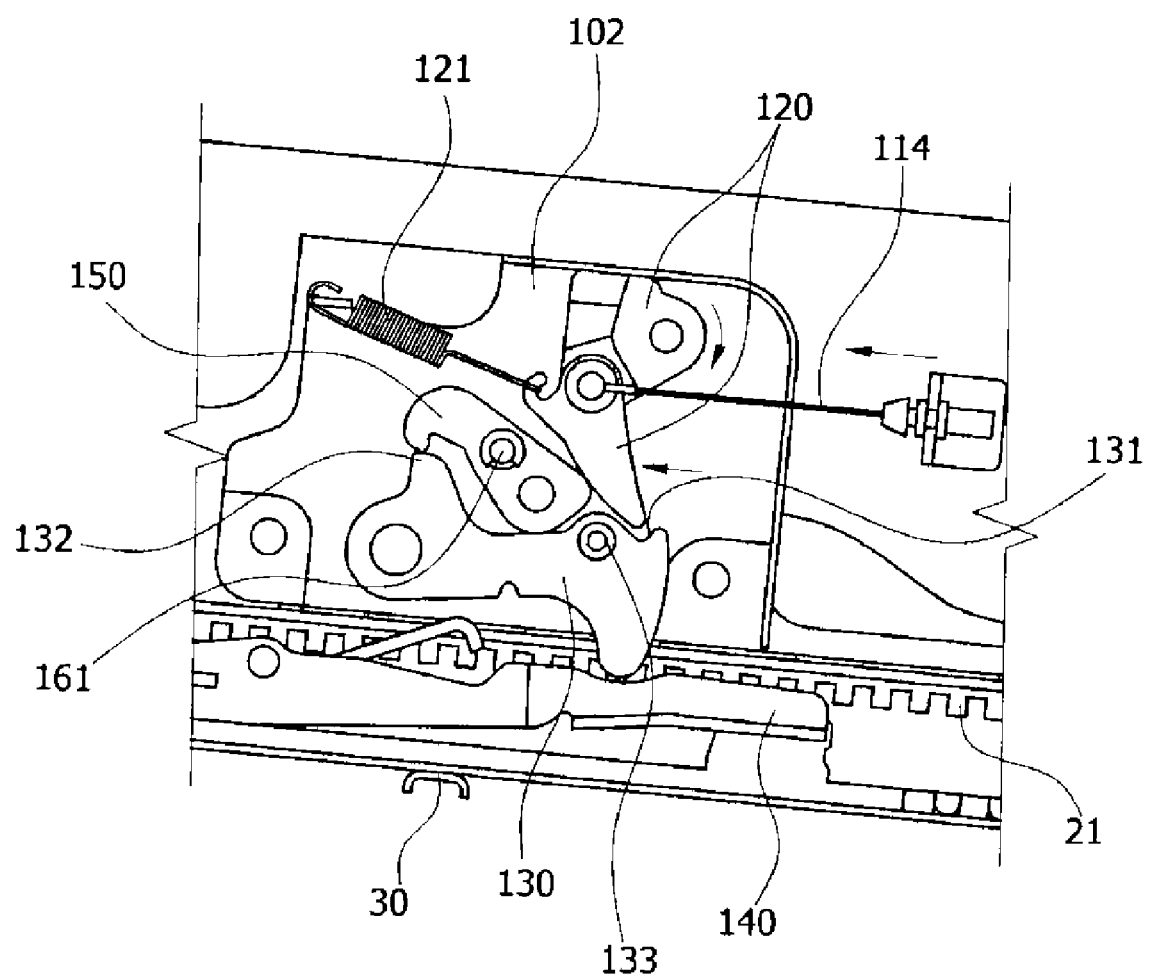

FIG. 3 is a perspective view illustrating a seat on which a walk-in memory apparatus for an automobile seat according to an exemplary of the present invention is installed. FIG. 4 is a front view illustrating an external force-providing member according to an exemplary of the present invention is installed. FIG. 5 is a side view illustrating a seat on which a track memory member is installed. FIGS. 6-10 are operational views illustrating how a seat is unlocked from a track. FIGS. 11-13 are operational views illustrating how a seat is locked on a track when moving backwards.

An automobile, particularly a coupe having rear seats without a rear door, is equipped with a front seat sliding in backward or forward directions, as illustrated in FIG. 3, such that an occupant for the rear seat can easily get in or out of the rear seat.

Typically, the front seat is designed so that a seat back 10 thereof is folded up for the rear-seat occupant. In this manner, when the seat back 10 is folded up, the entire seat moves forwards on the bottom of a body along tracks 20 formed in a longitudinal direction in an unlocked state, thereby sufficiently ensuring an entrance through which the rear-seat occupant enters to facilitate getting in or out of the rear seat. This apparatus is called a walk-in apparatus for an automobile seat.

Various embodiments of the present invention are configured so that, when the folded seat back 10 is unfolded in order to lock the seat sliding forward in a folded state at its original position, the seat is not locked at a position where the seat is unfolded, but is locked after moving backwards past a preset point, thereby eliminating inconvenience of a user who must unlock the seat again when the seat is locked as soon as the user unfolds the seat back 10, push the seat in a backward direction, and then lock the seat again (see the Background of the Invention).

In detail, according to various embodiments of the present invention, when moving backwards with the seat back 10 unfolded, the seat is unlocked from the tracks 20 when located ahead of a preset point (i.e., a position at which a reference stopper 30 is installed), and is locked on the tracks 20 when located behind the reference stopper 30. To this end, a track memory member 100 is installed on the seat.

Here, the track memory member 100 includes a means for providing an external force (hereinafter, referred to as external force-providing member) 110, an unlocking member 120, a locking member 130, a track lock plate 140, a latch plate 150, and a stopper bracket 160. The external force-providing member 110 is illustrated in detail in FIG. 4.

The external force-providing member 110 is configured to provide external force to the unlocking member 120 in cooperation with the folding of the seat back 10. As illustrated in FIG. 4, a pressing member 111 moving together with the seat back 10 is installed on one side of the seat back 10.

Since the seat back 10 is rotated around the rotary shaft 11 of a reclining part, the pressing member 111 pivots around the rotary shaft 11 when the seat back 10 is folded up or unfolded.

A rotating member 112 is installed along a motion path of the pressing member 111. The rotating member 112 is installed on the rotary shaft 11, and is rotated by the external force transmitted from the pressing member 111. When no force is applied to the pressing member 111, the pressing member 111 moving together with the seat back 10 returns to its original position by means of a spring 113 installed between the rotary shaft 11 and the rotating member 112.

Further, the rotating member 112 is connected with a cable 114 at one end thereof. As illustrated in FIG. 3, this cable 114 extends to the track memory member 100, and then is connected to the unlocking member 120.

As illustrated in FIG. 5, the cable 114 is connected with the unlocking member 120 of the track memory member 100 installed on the seat. The tracks 20 are installed below the seat in a longitudinal direction. One of the tracks 20 is provided with a rack gear type lock guide 21 on an upper portion thereof. Thus, the track lock plate 140 installed on the seat is clamped on the lock guide 21 by an elastic member 142, so that the seat is locked.

The track lock plate 140 is pivotally coupled to the seat.

In order to unlock the seat from the lock guide 21, the user pulls in an upward direction a slide lever 40 displaced in front of the track lock plate 140 at the seat and the track lock plate 140 integrally formed with the slide lever 40 pivots in a downward direction. Thereby the track lock plate 140 is disengaged from the lock guide 21, so that the seat can slide along the lock guide 21.

In another exemplary embodiment of the present invention, the track lock plate 140 can be disengaged from the lock guide 21 by folding up the seat back 10 without pulling the slide lever 40, so that the entire seat can slide. When the entire seat moves backwards, the external force applied to the track lock plate 140 is removed, and thus the track lock plate 140 is clamped on the lock guide 21 again after a preset point, so that the seat is locked as explained hereinafter in detail.

Figure 7:
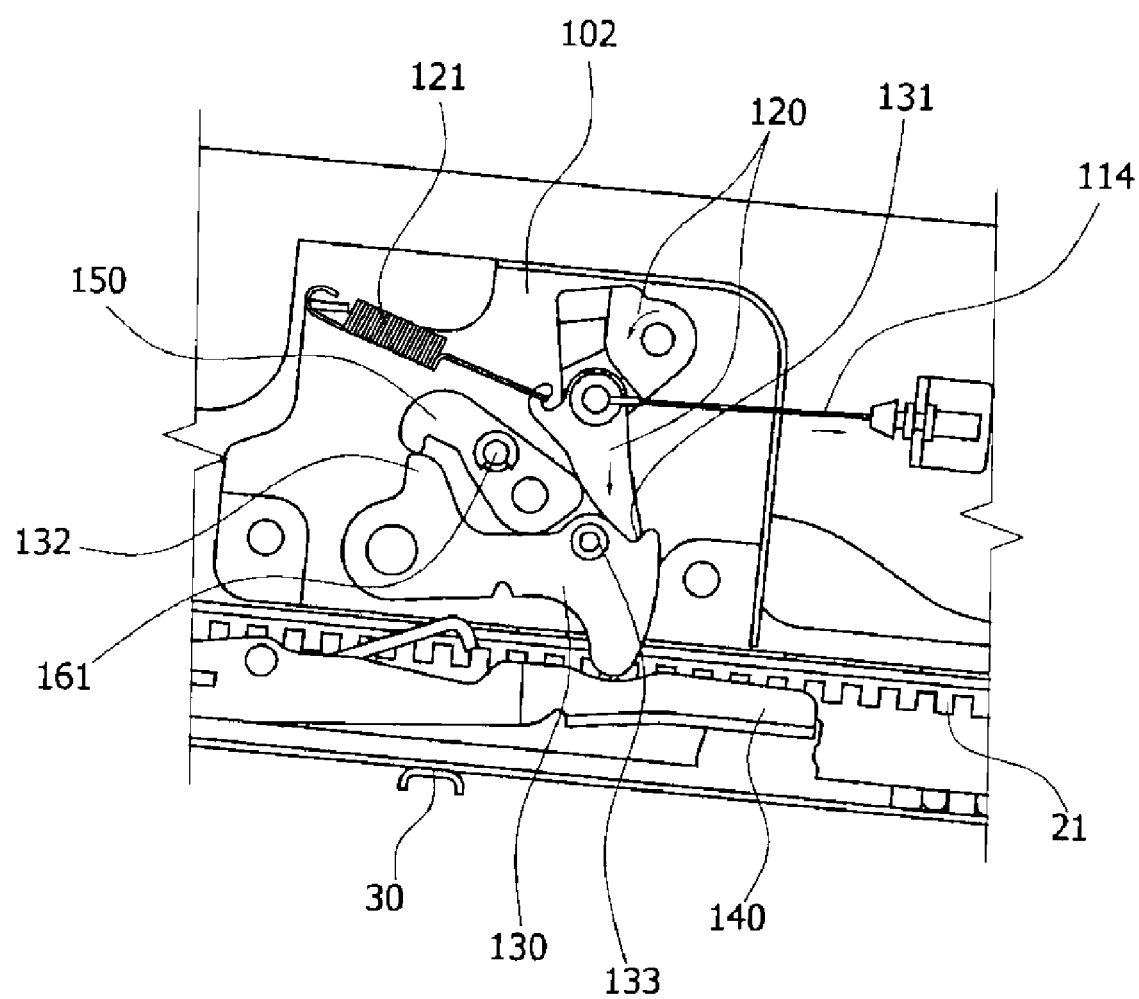
Figure 8:
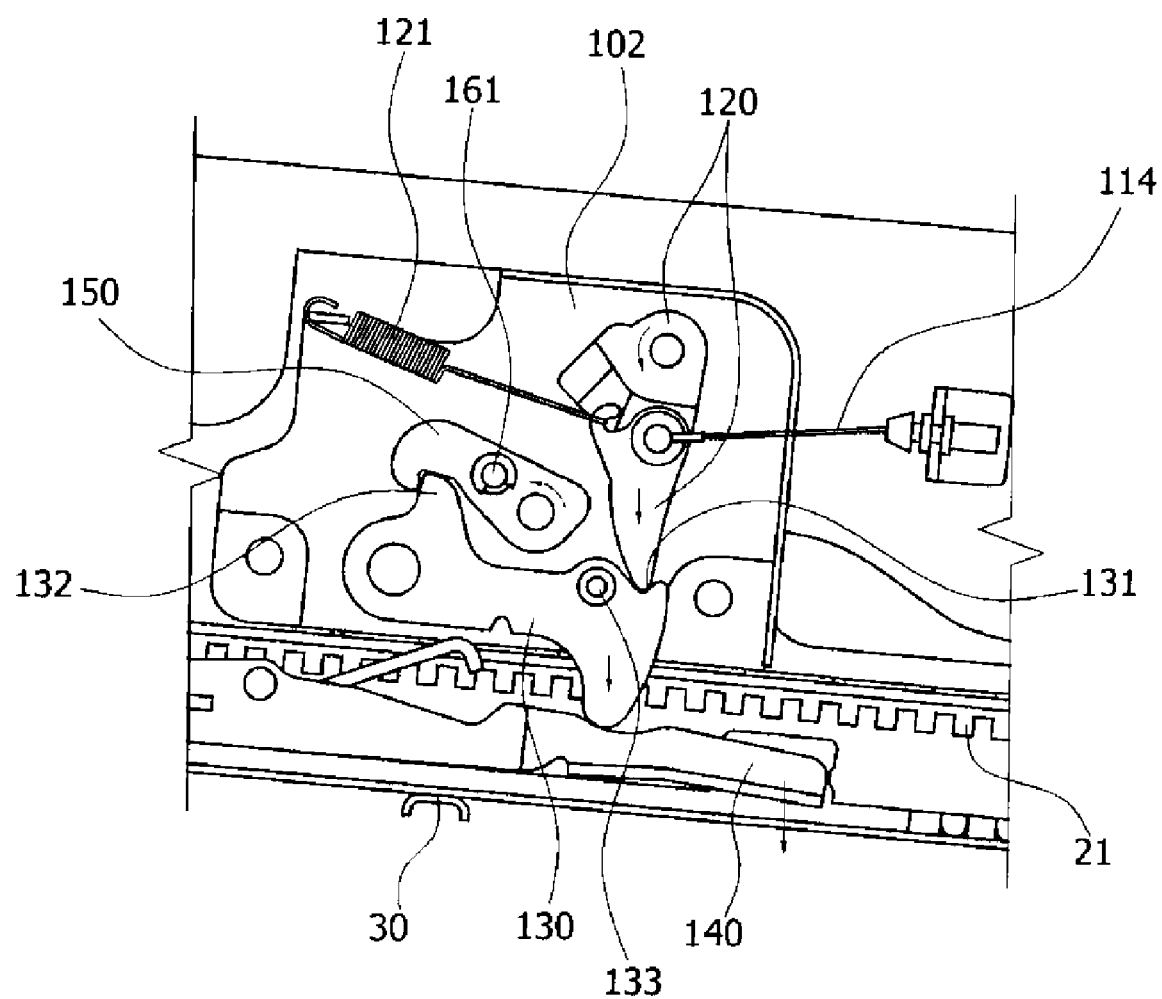

The configuration and operation of the track memory member 100 will be described with reference to FIGS. 6-13. In particular, FIGS. 6-8 shows only the configuration other than a cover member 101 of FIG. 5 and the stopper bracket 160 of FIG. 9 for the convenience' sake of description and in order to help understanding of the various embodiments of the present invention.

Figure 6:
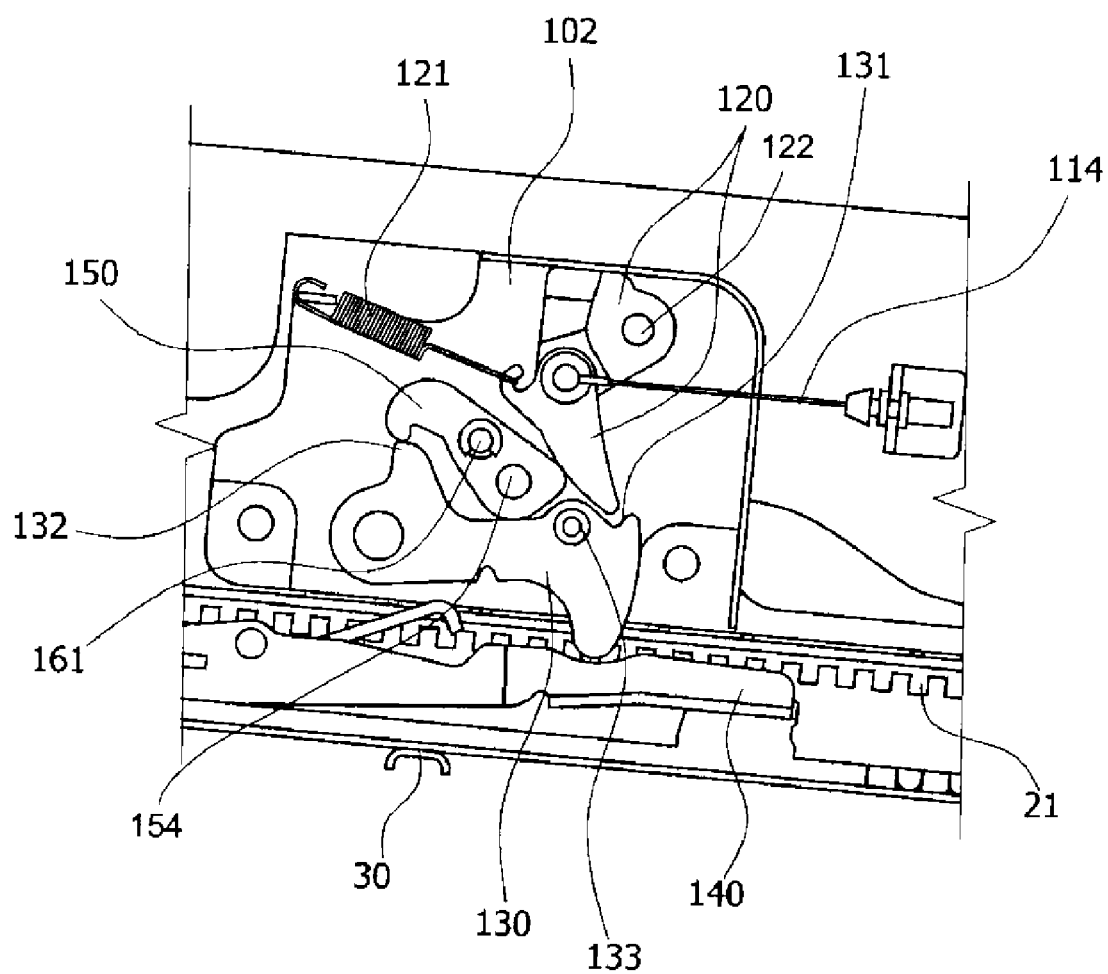
FIGS. 6 through 10 are operational views illustrating how a seat is unlocked from a track in accordance with the present invention.

First, referring to FIG. 6, the unlocking member 120 is pivotally installed on a base 102 via a hinge 122. The unlocking member 120 is connected to the external force-providing member 110, particularly the cable 114 connected to the rotating member 112. Thus, when the cable 114 is pulled by the rotating member 112, the unlocking member 120 is pivoted on the base 102 with respect to the hinge 122.

A tension spring 121 is installed opposite the cable 114 between one side of the unlocking member 120 and the base 102 such that the unlocking member 120 can be returned to its original position when the pulling force of the cable 114 is released.

Meanwhile, the locking member 130, which is pivoted by the external force received from the unlocking member 120, is also installed on the base 102 via an unlocking pin 133. As illustrated in FIG. 7, when the unlocking member 120 is pivoted with respect to the hinge 122, the locking member 130 is pushed by the unlocking member 120, and thus is pivoted in such a manner that one end thereof moves in a downward direction.

When one end of the locking member 130 moves in a downward direction, the external force is transmitted to the track lock plate 140 clamped on the lock guide 21. Thus, as illustrated in FIG. 8, the track lock plate 140 is disengaged from the lock guide 21, so that the entire seat can freely slide.

Figure 9:
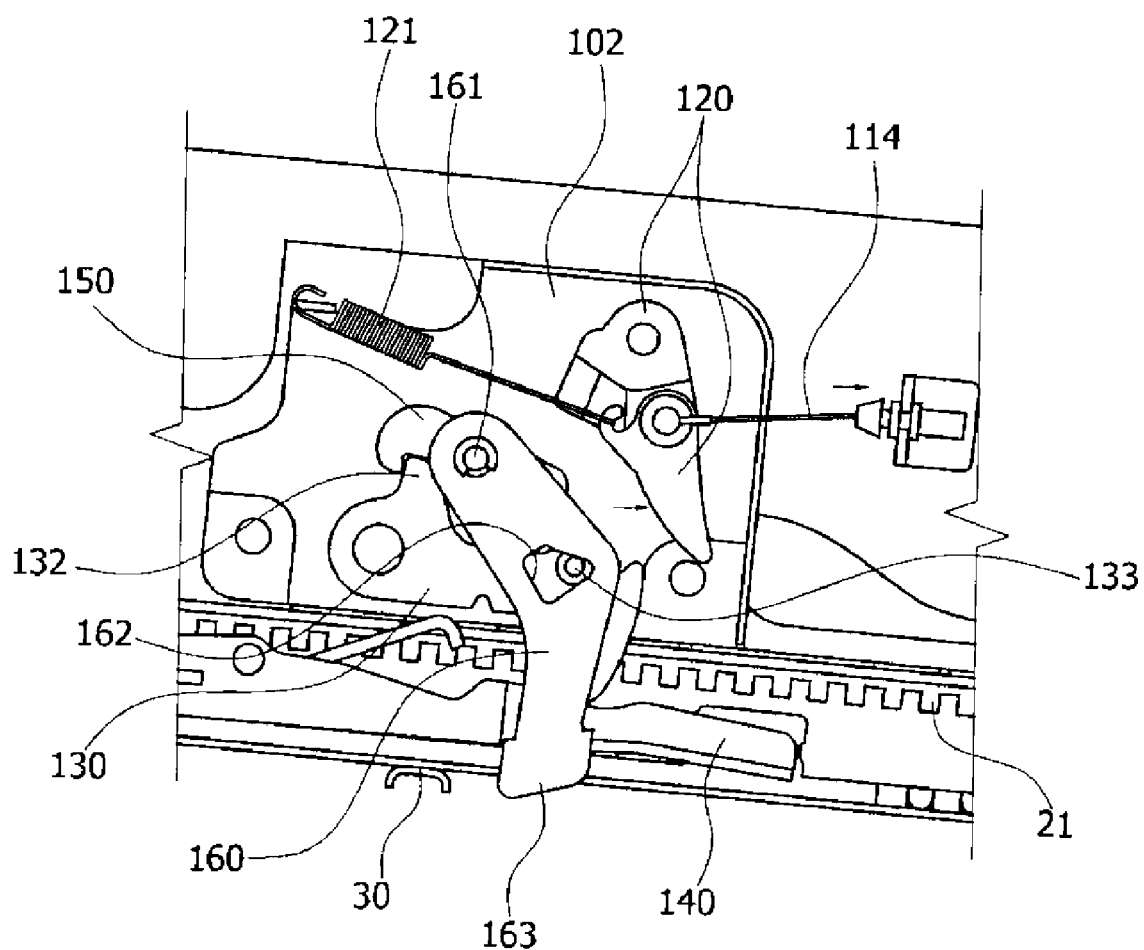

In this state, as illustrated in FIG. 9, when the cable 114 is pulled by the rotating member 112 to the maximum extent, the unlocking member 120 is disengaged from the locking member 130, and thus does not transmit the external force to the locking member 130. However, although the unlocking member 120 does no longer apply the external force to the locking member 130, the locking member 130 must continue to be engaged to the track lock plate 140 such that the seat is maintained in the unlocked state. To this end, the latch plate 150 fixing the position of the locking member 130 is installed on the base 102 via a hinge 154.

In detail, the latch plate 150 prevents the locking member 130 from being released from the track lock plate 140 after the locking member 130 is rotated to a certain degree such that the locking member 130 can be engaged to the track lock plate 140 in the state in which the unlocking member 120 does not apply the external force to the locking member 130.

Here, the locking member 130 includes a guide recess 131 and a catch step 132. The guide recess 131 functions to receive the external force from the unlocking member 120 within a predetermined section, and to allow the unlocking member 120 to be disengaged from the locking member 130 beyond the section.

As illustrated in FIG. 8, the catch step 132 of the locking member 130 is pivoted with respect to the unlocking pin 133 by the unlocking member 120 so that the catch step 132 enables the locking member 130 to be caught on the latch plate 150 although the unlocking member 120 is disengaged from the locking member 130 as shown in FIG. 9. Furthermore, the moment the catch step 132 of the locking member 130 is caught on the latch plate 150 becomes a dead point, and thus latch plate 150 pivots in a direction caught on the locking member 130 as sequentially illustrated in FIGS. 6-8. In the figures, the latch plate 150 rotates in a counterclockwise direction with respect to the hinge 154.

Thus, since the track lock plate 140 continues to be disengaged from the lock guide 21, the seat is unlocked from the track 20, and then slides forwards by means of force of a return spring 50 thereof as illustrated in FIG. 3.

Meanwhile, when the locking member 130 is released from the latch plate 150, the track lock plate 140 will be clamped on the lock guide 21 again, so that the seat can be locked on the track 20. To this end, in various embodiments of the present invention, such as that illustrated in FIG. 9, the latch plate 150 is coupled with the stopper bracket 160 via a latch pin 161.

The stopper bracket 160 is installed so as to be able to relatively rotate with respect to the latch plate 150 via the latch pin 161. As illustrated in FIGS. 6 and 8, the latch pin 161 has a lower height when the locking member 130 is restricted to the latch plate 150.

Further, in various embodiments of the present invention, the locking member 130 may be provided with the unlocking pin 133 protruding to pass through the stopper bracket 160. The stopper bracket 160 is provided with a bore 162 so as to receive the unlocking pin 133.

The stopper bracket 160 is provided with a contact part 163 at one end thereof which comes in contact with the reference stopper 30 installed on the bottom of the body. As illustrated in FIG. 10, when the entire seat slides forwards in the state in which the seat is unlocked from the track 20, the contact part 163 of the stopper bracket 160 comes in contact with the reference stopper 30 installed on the bottom of the body, so that the stopper bracket 160 is caused to rotate in a counter-clockwise direction viewed in the figure, and thus goes over the reference stopper 30. Accordingly, when the seat moves forwards, no particular action occurs although the contact part 163 of the stopper bracket 160 comes in contact with the reference stopper 30.

However, as illustrated in FIG. 11, after the rear-seat occupant gets in the rear seat, when the seat back 10 is unfolded in order to move the front seat in a backward direction and then to lock the front seat on the track 20 again, the cable 114 becomes loosen again by the unfolded seatback 10, and the unlocking member 120 is returned to its original position by restoring force of the spring 121 installed on the unlocking member 120.

Simultaneously, as the seat moves backwards, the contact part 163 of the stopper bracket 160 comes in contact with the reference stopper 30. The contact part 163 of the stopper bracket 160 has a declined slope toward the front. As such, as the seat moves backwards, the contact part 163 of the stopper bracket 160 is raised by the reference stopper 30, and thus applies upward force to the latch pin 161. Thereby, the latch plate 150 is caused to rotate in a clockwise direction viewed in the figure.

When the latch plate 150 rotates in a clockwise direction with respect to hinge 154 viewed in the figure, the locking member 130 restricted to the latch plate 150 is released. Thus, as illustrated in FIG. 12, the locking member 130 rotate in a counterclockwise direction viewed in the figure by means of its own weight, so that the pressing force applied to the latch plate 150 is released.

As illustrated in FIG. 13, when the track lock plate 140 does no longer receive the external force from the locking member 130, the track lock plate 140 rotates in a counter-clockwise direction viewed in the figure by means of the elastic member 142, and thus is clamped on the lock guide 21 of the track 20, so that the entire seat is locked.

Accordingly, as in FIG. 13, as the seat back 10 is completely unfolded, the pulled cable 114 returns to its original position, and thus all the unlocking member 120, the locking member 130 and the latch plate 150 return to their initial positions.

Here, it is good to properly set the position of the reference stopper 30 in consideration of a movement amount of the entire seat. Although the seat back 10 is unfolded on the basis of the reference stopper 30, the seat is not locked when the stopper bracket 160 is located at the front of the reference stopper 30. Thus, only when the stopper bracket 160 is located at the rear of the reference stopper 30, the locking member 130 is released from the latch plate 150, so that the seat is locked.

For convenience in explanation and accurate definition in the appended claims, the terms "upper" or "lower", "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present inventions as well as various alternatives and modifications thereof. It is intended that the scope of the invention be defined by the Claims appended hereto and their equivalents.

What is claimed is:

1. A walk-in memory apparatus for an automobile seat of a vehicle, comprising:
    a track formed on a bottom portion of the vehicle;
    a track memory member connected to the seat, the track memory member including a stopper bracket, wherein the track memory member is slidably mounted to the track; and
    a reference stopper displaced on a portion of the track;
    wherein the reference stopper activates the stopper bracket of the track memory member such that the track memory member is unlocked from the track when the stopper bracket is located ahead of the reference stopper and locked with the track when the stopper bracket is located behind the reference stopper and moves backwards; and
    wherein the track memory member includes:
        an external force-providing member providing external force in cooperation with folding operation of the seat back;
        an unlocking member pivotally coupled to a base, the unlocking member selectively activated by the external force-providing member, wherein the unlocking member has a restoring force;
        a locking member pivotally coupled to the base, the locking member selectively pivoted by the unlocking member;
        a track lock plate hingedly coupled to the seat, the track lock plate selectively disengaged from the track, by the locking member such that the seat slides; and
        a latch plate pivotally coupled to the base, the latch plate selectively being engaged with the locking member such that the locking member continues to unlock the track lock plate to the track while the unlocking member does not apply the external force to the locking member;
    wherein the stopper bracket activated by the reference stopper, releases the latch plate from the locking member to lock the track lock plate to the track when the seat moves backwards.

2. The walk-in memory apparatus according to claim 1, wherein the restoring force of the unlocking member is enforced by an elastic member.

3. The walk-in memory apparatus according to claim 1, wherein the track lock plate is biased toward the track memory plate by an elastic member.

4. The walk-in memory apparatus according to claim 1, wherein the unlocking member comprises at least two sections pivotally coupled each other.

5. The walk-in memory apparatus according to claim 1, wherein a lock may be formed on the track in a longitudinal direction thereof.

6. The walk-in memory apparatus according to claim 1, wherein the external force-providing member includes:
    a pressing member offset from a rotation center of the seatback and attached to the seat back;
    a rotating member co-axially coupled to the rotation center of the seat back, one end of which is restoreably rotated by operation of the pressing member; and a cable connecting the other end of the rotating member with the unlocking member.

7. The walk-in memory apparatus according to claim 6, wherein the rotating member is restored by a coil spring.

8. The walk-in memory apparatus according to claim 1, wherein the locking member includes:
   a guide recess to selectively receive a first end of the unlocking member, the guide recess activated by the unlocking member; and
   a catch step to selectively catch a second end of the unlocking member even when the unlocking member is disengaged from the locking member.

9. The walk-in memory apparatus according to claim 8, wherein the stopper bracket is pivotally connected with the latch plate, and causes the locking member to be released from the latch plate by the reference stopper when the seat moves backwards.

10. The walk-in memory apparatus according to claim 9, wherein the stopper bracket is connected with the latch plate via a latch pin and a contact part of the stopper bracket is offset from the latch pin.

11. The walk-in memory apparatus according to claim 10, wherein the contact part has a slope at one end thereof such that the stopper bracket freely rotates the latch plate with respect to the latch pin when the seat moves forwards after contact with the reference stopper but is raised when the seat moves backwards after contact with the reference stopper.

12. A passenger vehicle comprising the walk-in memory apparatus according to claim 1.

* * * * *